Figure 1:
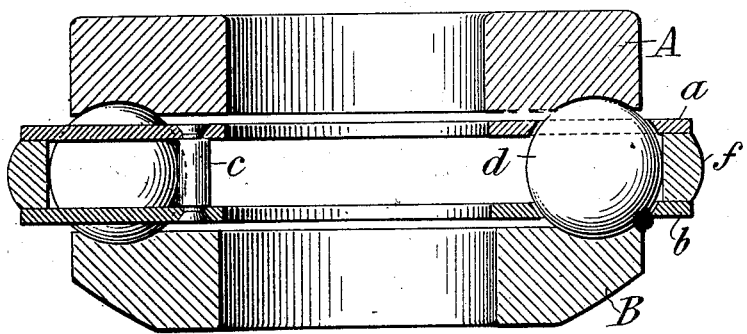

B. W. FJELLMAN.
BALL RETAINER FOR THRUST BALL BEARINGS.
APPLICATION FILED MAR. 10, 1913.

1,199,169.

Patented Sept. 26, 1916.

WITNESSES:

INVENTOR
Bengt Wiktor Fjellman
By Attorneys,

UNITED STATES PATENT OFFICE.

BENGT WIKTOR FJELLMAN, OF GOTTENBORG, SWEDEN, ASSIGNOR, BY MESNE ASSIGNMENTS, TO S. K. F. BALL BEARING COMPANY, OF HARTFORD, CONNECTICUT, A CORPORATION OF CONNECTICUT.

BALL-RETAINER FOR THRUST BALL-BEARINGS.

1,199,169.  Specification of Letters Patent.  Patented Sept. 26, 1916.

Application filed March 10, 1913. Serial No. 753,304.

*To all whom it may concern:*

Be it known that I, BENGT WIKTOR FJELLMAN, a subject of the King of Sweden, and resident of Gottenborg, in the Kingdom of Sweden, have invented certain new and useful Improvements in or Relating to Ball-Retainers for Thrust Ball-Bearings, of which the following is a specification, reference being had therein to the drawing accompanying and forming a part thereof.

This invention relates to certain improvements in ball retainers for thrust ball bearings.

It is well known to those skilled in the art that the balls of an end-thrust ball bearing, *i. e.* the centers of the balls, move in their circular path with an angular velocity which is equal to half that of the revolving shaft. The same is true with regard to the cage or ball retainer. On the other hand, a point on the surface of a ball generally moves with a speed corresponding to some other angular velocity. Inasmuch as, on account of the centrifugal force, the balls are usually pressed with great power against the outer part of the cage or, in using bearing rings provided with races, are even clamped between the latter, it appears that a considerable sliding friction easily arises at the said parts, thus causing losses of power. Also, at high speeds of rotation, an injurious heating of the bearing will take place.

The object of the invention is, in part, to remove the said draw-back and to provide a ball retainer of a novel and improved construction, in which the balls are reliably kept in positions relatively to each other and to the bearing surfaces, and in which the friction and wear are reduced to a minimum.

The invention consists, chiefly, in a ball retainer having two parts adapted to rotate relatively to each other, one of said parts, which serves to keep the balls apart from each other, being caused to rotate with the angular velocity of the centers of the balls, while the other part, which is in contact with the balls at the points thereof remote from the axis of the bearing, is free to rotate with the angular velocity of the said peripheral points of the balls. Preferably, the latter part of the ball retainer is supported by the former.

A further advantage of this improved construction of the ball retainer consists in this that the balls pressed by the centrifugal force against the part of said retainer forming the outer support for the balls are caused to move exactly in the desired path. It is true that also in a cage or retainer having no relatively movable parts, the balls are pressed, during running, against the outer part of the retainer, but, obviously, it is far easier to have a simple ring made with accurate dimensions than to have the several holes for the balls made in exactly predetermined distances from the axis of the bearing. Thus, a cage or retainer according to this invention may be made far more exactly than a one part retainer.

Furthermore, a cage or retainer according to this invention has the important advantage that the part thereof forming the outer support for the balls may very easily be made sufficiently strong to reliably withstand the pressure of the balls.

In the drawings, I have shown, by way of example, two forms or embodiments of my invention.

Figure 2:
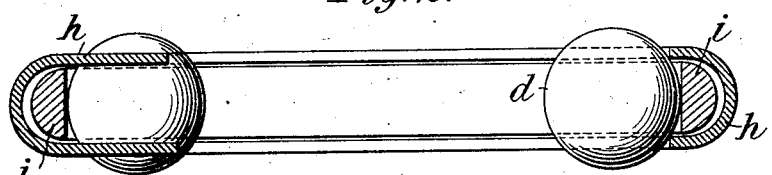
Figure 3:
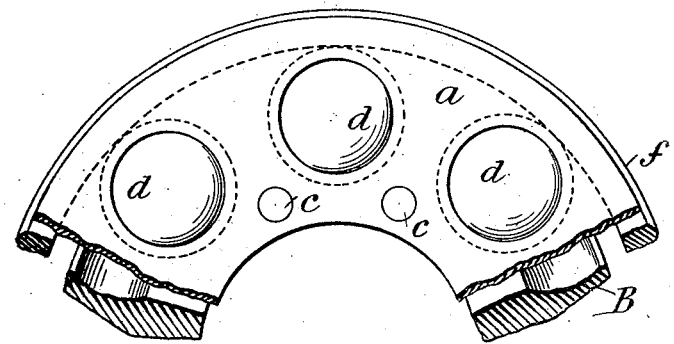
Figure 4:
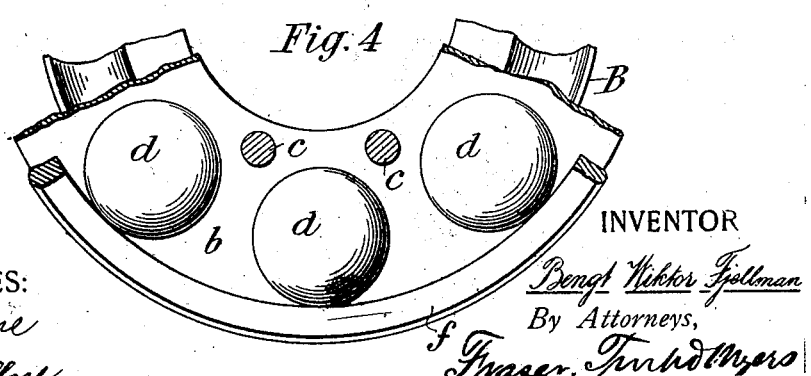

Figure 1 is a central vertical section of an end-thrust ball bearing provided with the improved ball retainer; Fig. 2 is a similar section of a modified form of the retainer; Fig. 3 is a segmental plan of the balls and upper retainer of Fig. 1; and Fig. 4 is a segmental plan below the upper retainer of Fig. 1.

Referring first to Fig. 1, the part of the ball retainer serving to keep the balls apart from each other has the well-known form of two perforated disks or plates *a* and *b* kept by bolts *c* or other suitable means at a predetermined distance from each other. Each ball *d* is placed in two opposite holes of the plates *a*, *b* so as to protrude therethrough, as shown at the right of Fig. 1. Placed between the two plates *a* and *b* is a loose ring *f* encircling the series of balls and affording an outer support for the same.

The inner diameter of the ring *f* is such that the balls are caused to move exactly in the predetermined path. Thus, for instance, the inner diameter of the ring *f* may be such that the pressure of the race rings A and B on the balls *d* is exactly axial, or, if desired, the said diameter may be such that the pressures of the race rings on the balls have such outward directions (away from the axis of the bearing) that the balls are caused to run on a conical surface having its apex in the center of the bearing, i. e. the point of intersection of the axis of the bearing with a plane through the centers of the balls.

In the embodiment of the invention shown in Fig. 2, the part of the cage or retainer serving to keep the balls apart from each other consists of a sheet-metal ring $h$, U-shaped in cross-section, and provided at its inwardly projecting flanges with recesses for the balls. Placed between the said recessed flanges of the ring $h$ is a loose ring $i$ affording an outer support for the balls. Obviously, this ring $i$ is placed in the outer ring $h$ before the latter is finally shaped.

It will be seen that the cage illustrated in the drawings constitutes a retainer for holding the balls from individual displacement. The device thus constitutes a self-contained bearing. The ring for resisting the centrifugal displacement of the series of balls or for preventing individual displacement of a ball radially of its axis of revolution is shown carried by the bearing in such a manner that the entire device is self-contained. The annular support, the cage members and the balls when properly assembled, may be transported, placed in position and removed without becoming disassembled. The outer ring and the balls are free to perform a relative rolling movement when the balls rotate about axes parallel to the axis of rotation of the series of balls.

It is to be understood that I do not limit myself to the particular forms illustrated by way of example, for obviously the invention may be used either in whole or in part and may be carried out in various ways, without departing from the spirit and scope of the invention as hereinafter claimed.

The surfaces of the rings A and B of the bearings in contact with the balls need not be formed with races, but, obviously, said surfaces may be plane, if desired.

Having thus described my invention, what I claim and desire to secure by Letters Patent, is:—

1. A ball retainer for thrust ball bearings including means for keeping the balls separated from each other, and a ring surrounding the balls and rotatable by the balls relatively to the ball separating means.

2. A ball retainer for thrust ball bearings including means for keeping the balls separated from each other, and a ring surrounding the balls and rotatable by the balls relatively to the ball separating means upon rotation of the balls upon axes parallel to the axis of rotation of the series of balls.

3. A ball retainer for thrust ball bearings including means supported by the balls for keeping same separated from each other, and a ring surrounding the balls and rotatable by the balls relatively to the ball separating means.

4. A ball retainer for thrust ball bearings including means for keeping the balls separated from each other, and a ring surrounding the balls and rotatable by the balls relatively to the ball separating means, said ring being supported by the said means.

5. A self-contained ball retainer for thrust ball bearings including means for keeping the balls separated from each other, and a ring surrounding the balls and rotatable by the balls relatively to the ball separating means.

In witness whereof, I have hereunto signed my name in the presence of two subscribing witnesses.

BENGT WIKTOR FJELLMAN.

Witnesses:
   Uno Forsberg,
   Tomas Hallgren.